US011437186B2

(12) United States Patent
Wang et al.

(10) Patent No.: US 11,437,186 B2
(45) Date of Patent: Sep. 6, 2022

(54) MULTI-PHASE COUPLED INDUCTOR HAVING COMPENSATION WINDINGS

(71) Applicant: UNIVERSITY OF FLORIDA RESEARCH FOUNDATION, INCORPORATED, Gainesville, FL (US)

(72) Inventors: Shuo Wang, Gainesville, FL (US); Le Yang, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 424 days.

(21) Appl. No.: 16/341,103

(22) PCT Filed: Oct. 19, 2017

(86) PCT No.: PCT/US2017/057353
§ 371 (c)(1),
(2) Date: Apr. 11, 2019

(87) PCT Pub. No.: WO2018/075748
PCT Pub. Date: Apr. 26, 2018

(65) Prior Publication Data

US 2020/0312541 A1 Oct. 1, 2020

Related U.S. Application Data

(60) Provisional application No. 62/410,050, filed on Oct. 19, 2016.

(51) Int. Cl.
*H01F 27/28* (2006.01)
*H01F 30/12* (2006.01)
(Continued)

(52) U.S. Cl.
CPC ............. *H01F 30/12* (2013.01); *H01F 27/24* (2013.01); *H01F 27/28* (2013.01); *H01F 27/38* (2013.01); *H01F 37/00* (2013.01)

(58) Field of Classification Search
CPC .......... H01F 30/12; H01F 27/24; H01F 27/28; H01F 27/38; H01F 37/00; H01F 3/14
See application file for complete search history.

(56) References Cited

U.S. PATENT DOCUMENTS 4,766,365 A * 8/1988 Bolduc ..................... G05F 3/06
174/DIG. 17
4,902,942 A * 2/1990 El-Hamamsy .......... H01F 29/14
315/276

(Continued)

FOREIGN PATENT DOCUMENTS

JP 2002-516479 A 6/2002

OTHER PUBLICATIONS

International Search Report and Written Opinion for International Application PCT/US2017/057353 dated Feb. 7, 2018, 12 pages.

*Primary Examiner* — Mang Tin Bik Lian
(74) *Attorney, Agent, or Firm* — Alston & Bird LLP

(57) ABSTRACT

A multi-phase coupled inductor can include: an upper E core including a first upper limb, a second upper limb, and a third upper limb; a lower E core including a first lower limb, a second lower limb, and a third lower limb; a first winding to wind the first upper limb and the first lower limb; a second winding to wind the second upper limb and the second lower limb; a third winding to wind the third upper limb and the third lower limb; a fourth winding to wind the first lower limb; and a fifth winding to wind the third lower limb. A first phase current can flow from the first winding to the fifth winding, and a third phase current can flow from the third winding to the fourth winding.

29 Claims, 8 Drawing Sheets

(51) Int. Cl.
*H01F 27/24* (2006.01)
*H01F 27/38* (2006.01)
*H01F 37/00* (2006.01)

(56) References Cited

U.S. PATENT DOCUMENTS

| | | | | | |
|---|---|---|---|---|---|
| 5,416,458 | A * | 5/1995 | Menke | H01F 27/36 336/12 |
| 6,317,021 | B1 | 11/2001 | Jansen | |
| 6,348,848 | B1 * | 2/2002 | Herbert | H01F 3/12 323/308 |
| 6,549,436 | B1 * | 4/2003 | Sun | H02M 3/337 363/44 |
| 7,136,293 | B2 * | 11/2006 | Petkov | H02M 3/3376 363/126 |
| 8,497,755 | B2 * | 7/2013 | Park | H01F 38/38 336/12 |
| 9,295,145 | B1 | 3/2016 | Folker et al. | |
| 2004/0189432 | A1 * | 9/2004 | Yan | H01F 37/00 336/182 |
| 2004/0218404 | A1 * | 11/2004 | Yan | H02M 3/3372 363/16 |
| 2004/0239470 | A1 | 12/2004 | Lu | |
| 2006/0250207 | A1 * | 11/2006 | Shudarek | H01F 27/306 336/212 |
| 2007/0007909 | A1 * | 1/2007 | Kim | H05B 41/2827 315/282 |
| 2007/0217103 | A1 * | 9/2007 | Af Klercker Alakula | H01F 27/38 361/58 |
| 2008/0224812 | A1 * | 9/2008 | Chandrasekaran | H02M 7/217 336/212 |
| 2011/0148556 | A1 * | 6/2011 | Park | H01F 30/02 336/12 |
| 2013/0200975 | A1 * | 8/2013 | Shudarek | H01F 17/06 336/170 |
| 2014/0241012 | A1 * | 8/2014 | Lindberg-Poulsen | H02M 3/33553 363/17 |
| 2015/0123402 | A1 * | 5/2015 | Wagoner | H01F 27/38 290/44 |

* cited by examiner $R_1 = 2R_s + R_g + R_l$ $R_0 = R_g + R_l$ $R_1 = kR_0 (k \neq 1)$

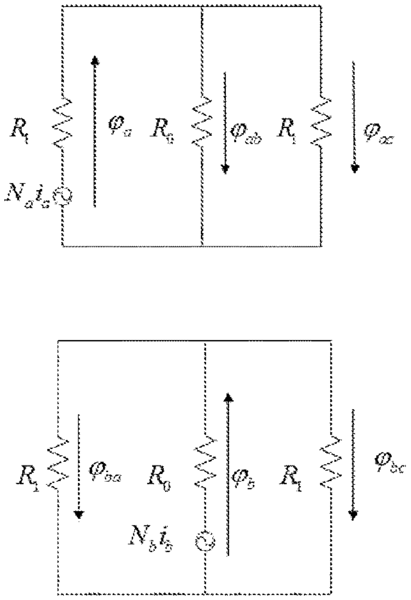

$$\varphi_a = \frac{N_a i_a}{R_1 + R_0 // R_1} \qquad \varphi_{ab} = \varphi_a \frac{R_1}{R_1 + R_0} \qquad \varphi_{ac} = \varphi_a \frac{R_0}{R_1 + R_0}$$

$$\varphi_c = \frac{N_c i_c}{R_1 + R_0 // R_1} \qquad \varphi_{ca} = \varphi_c \frac{R_0}{R_1 + R_0} \qquad \varphi_{cb} = \varphi_c \frac{R_1}{R_1 + R_0}$$

$$\varphi_b = \frac{N_b i_b}{R_0 + R_1 / 2} \qquad \varphi_{ba} = \frac{1}{2} \frac{N_b i_b}{R_0 + R_1 / 2} \qquad \varphi_{bc} = \frac{1}{2} \frac{N_b i_b}{R_0 + R_1 / 2}$$

Figure 3

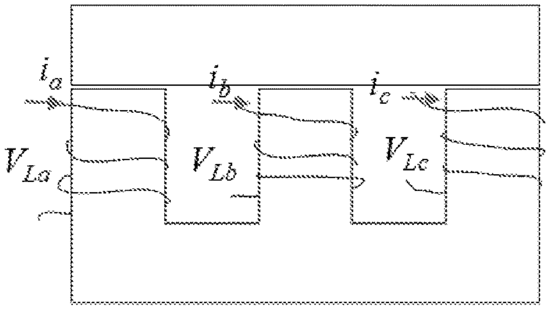

$$V_{La} = \frac{N_a d(\varphi_a - \varphi_{ba} - \varphi_{ca})}{dt}$$

$$V_{Lb} = \frac{N_b d(\varphi_b - \varphi_{ab} - \varphi_{cb})}{dt}$$

$$V_{Lc} = \frac{N_c d(\varphi_c - \varphi_{bc} - \varphi_{ac})}{dt}$$

$$\begin{bmatrix} V_{La} \\ V_{Lb} \\ V_{Lc} \end{bmatrix} = \begin{bmatrix} L_{aa} & -L_{ba} & -L_{ca} \\ -L_{ab} & L_{bb} & -L_{cb} \\ -L_{ac} & -L_{bc} & L_{cc} \end{bmatrix} \begin{bmatrix} i_a \\ i_b \\ i_c \end{bmatrix}$$

$$L_{aa} = \frac{N_a^2}{R_1 + R_0 // R_1} \qquad L_{ba} = \frac{N_a N_b}{R_0 + R_1 / 2}$$

$$L_{ca} = \frac{N_a N_c}{R_1 + R_0 // R_1} \frac{R_0}{R_1 + R_0}$$

Figure 4

$$L(mH) = \begin{bmatrix} 0.1734 & -0.067118 & -0.067961 \\ -0.067118 & 0.18246 & -0.067587 \\ -0.067961 & -0.067587 & 0.17422 \end{bmatrix}$$

MULTI-PHASE COUPLED INDUCTOR HAVING COMPENSATION WINDINGS

CROSS REFERENCE TO RELATED APPLICATIONS

This application is a National Stage Application, filed under 35 U.S.C. § 371, of International Application No. PCT/US2017/057353, filed Oct. 19, 2017, which claims the benefit of U.S. Provisional Patent Application Ser. No. 62/410,050, filed Oct. 19, 2016, which is incorporated herein by reference in its entirety, including any figures, tables, and drawings.

BACKGROUND OF THE INVENTION

Inductors are widely used in, and are very important components of, the filter designs of converters. Usually, these inductors are constructed by using separate magnetic cores, such as toroidal or E cores. In order to reduce the total volume and improve the efficiency of the inductors and filters, three-phase coupled inductors are introduced in power filter design because the total volume can be reduced and the filter efficiency can be improved compared with separate inductors. However, the conventional three-phase coupled inductor design has a strict requirement on the shape of the magnetic core to keep the three-phase AC balanced. Though EE or EI shaped cores are used as a core of the conventional three-phase coupled inductor based on cost and simplicity, it is not easy to accomplish a balanced three-phase AC.

BRIEF SUMMARY

Embodiments of the subject invention provide novel and advantageous winding structures that include two additional compensation windings to balance the three-phase coupled inductors with asymmetrical E cores.

In an embodiment of the present invention, a three-phase coupled inductor can include a first winding on a first limb, a second winding on a second limb, a third winding on a third limb; a fourth winding on the first limb, and a fifth winding on the third limb, wherein a first number of turns of the first winding is the same as a third number of turns of the third winding, and wherein a fourth number of turns of the fourth winding is the same as a fifth number of turns of the fifth winding.

In another embodiment of the present invention, a three-phase coupled inductor can include a first winding on a first limb, a second winding on a second limb, a third winding on a third limb, a fourth winding on the first limb, and a fifth winding on the third limb, wherein a first phase current flows through the first winding and the fifth winding, wherein a second phase current flows through the second winding, and wherein a third phase current flows through the third winding and the fourth winding.

In another embodiment of the present invention, a three-phase coupled inductor can include: an upper E core comprising a first upper limb, a second upper limb, and a third upper limb; a lower E core comprising a first lower limb, a second lower limb, and a third lower limb; a first winding to wind the first upper limb; a second winding to wind the second upper limb; a third winding to wind the third upper limb; a fourth winding to wind the first lower limb; and a fifth winding to wind the third lower limb.

In another embodiment of the present invention, a multi-phase coupled inductor can include: a first outer leg; a second outer leg; a center leg between the first outer leg and the second outer leg; a first coil winding the first outer leg; a second coil winding the center leg; a third coil winding the second outer leg; and a compensation coil winding at least one of the first outer leg, the second outer leg, and the center leg, wherein a first phase current flows through the first coil, wherein a second phase current flows through the second coil, wherein a third phase current flows through the third coil, and wherein at least one of the first, second, and third phase currents flows through the compensation coil.

In another embodiment of the present invention, a multi-phase coupled inductor can include: an upper body; a lower body; a first outer leg connecting the upper body and the lower body at a left side; a second outer leg connecting the upper body and the lower body at a right side; a center leg connecting the upper body and the lower body between the first outer leg and the second outer leg; a first winding wrapping (or wrapped around) the first outer leg; a second winding wrapping (or wrapped around) the center leg; a third winding wrapping (or wrapped around) the second outer leg; a fourth winding wrapping (or wrapped around) the first outer leg; a fifth winding wrapping (or wrapped around) the second outer leg; a sixth winding wrapping (or wrapped around) the first outer leg; a seventh winding wrapping (or wrapped around) the center leg; an eighth winding wrapping (or wrapped around) the second outer leg; a ninth winding wrapping (or wrapped around) the first outer leg; and a tenth winding wrapping (or wrapped around) the second outer leg. The upper body, the lower body, the first outer leg, the second outer leg, and the center leg can be integrally or monolithically formed.

BRIEF DESCRIPTION OF THE DRAWINGS

FIG. 3 shows magnetomotive force (MMF) sources with regard to the magnetic equivalent circuit under superposition theorem.

FIG. 4 shows induced electromotive force (EMF) with regard to the three-phase coupled inductor of FIG. 1A, under Faraday's law.

DETAILED DESCRIPTION

Embodiments of the subject invention provide novel and advantageous winding structures that can be applied in a multi-phase coupled inductor designs, including three-phase coupled inductor designs with asymmetrical E cores. By adding two additional compensation windings, the coupled inductor can achieve a balanced three-phase impedance on an asymmetrical E core. In addition, the structures of embodiments of the subject invention can also be applied in three-phase transformer systems.

Figure 1A:
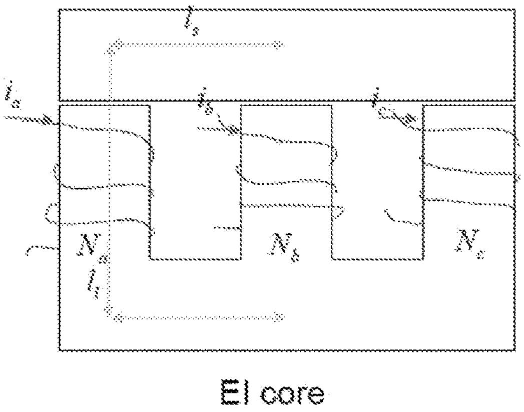
FIG. 1A shows a view of a three-phase coupled inductor including an EI core.
Figure 1B:
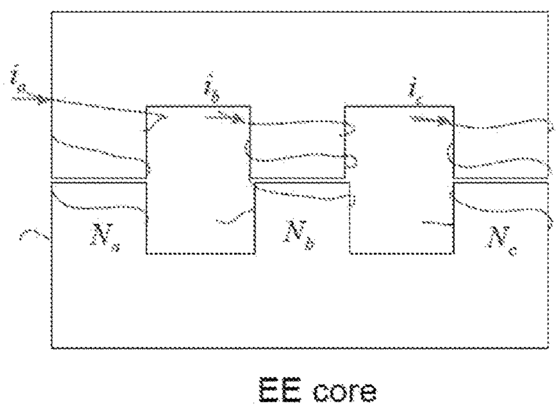
FIG. 1B shows a view of a three-phase coupled inductor including an EE core.

FIGS. 1A and 1B show front views of three-phase coupled inductors including an EI core and an EE core, respectively. Referring to FIG. 1A, the EI core comprises an upper I core and a lower E core, wherein the lower E core comprises a first lower limb wound by a first winding, a second lower limb wound by a second winding, and a third limb wound by a third winding. Referring to FIG. 1B, the EE core comprises an upper E core including a first upper limb, a second upper limb, and a third upper limb; and a lower E core including a first lower limb, a second lower limb, and a third lower limb, wherein the first upper and lower limbs are wound by a first winding, the second upper and lower limbs are wound by a second winding, and the third upper and lower limbs are wound by a third winding. A first phase current $i_a$ flows through the first winding, a second phase current $i_b$ flows through the second winding, and a third phase current $i_c$ flows through the third winding, thereby establishing a three-phase coupled inductor. For a balanced three-phase coupled inductor, each limb of the E core has the same cross-sectional area and each of the first, second, and third windings has the same number of turns. That is, a first number of turns $N_a$ of the first winding, a second number of turns $N_b$ of the second winding, and a third number of turns $N_c$ of the third winding are the same.

Figure 2:
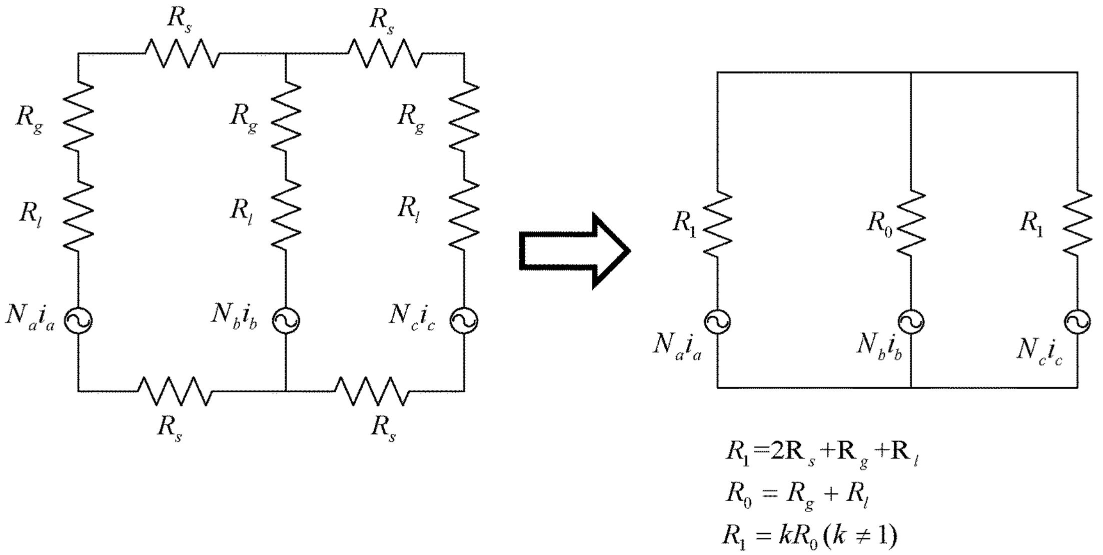
FIG. 2 shows magnetic equivalent circuits with regard to a three-phase coupled inductor.

FIG. 2 shows magnetic equivalent circuits with regard to the three-phase coupled inductor shown in FIG. 1. Referring to FIG. 2, R represents a reluctance of the magnetic core and airgap. $R_g$ represents the reluctance of airgap in each limb, $R_l$ represents the limb's reluctance of the magnetic core in each limb, and $R_s$ represents the reluctance of the magnetic core between two adjacent limbs. In a simplified equivalent circuit of FIG. 2, $R_1$ is expressed as a summation of $2R_s+R_g+R_l$, $R_0$ is expressed as a summation of $R_g+R_l$, and thus $R_1$ can be expressed as the product of k and $R_0$ (where k is not 1). In addition, a magnetomotive force (MMF) of each winding is expressed as the product of a number of turns of the each winding and a current flowing through each winding. The first MMF of the first winding is represented as $N_a i_a$, the second MMF of the second winding is represented as $N_b i_b$, and the third MMF of the third winding is represented as $N_c i_c$.

FIG. 3 shows MMF sources with regard to the magnetic equivalent circuit under superposition theorem. The MMF expressed as the number of turns and the current can be expressed, alternatively, as the product of a magnetic flux φ and the reluctance R. That is, the first MMF $N_a i_a$, is expressed as the product of a first magnetic flux $\varphi_a$ and a first total reluctance R ($R_1+R_0//R_1$), the second MMF $N_b i_b$ is expressed as the product of a second magnetic flux $\varphi_b$ and a second total reluctance R ($R_0+R_1/2$), and the third MMF $N_c i_c$ is expressed as the product of a third magnetic flux $\varphi_c$ and a third total reluctance R ($R_1+R_0//R_1$). In addition, the first MMF $N_a i_a$ of the first winding is calculated without consideration of the second MMF $N_b i_b$ and the third MMF $N_c i_c$ under the superposition theorem, and the second MMF $N_b i_b$ of the second winding is similarly calculated without consideration of first MMF $N_a i_a$ and the third MMF $N_c i_c$. As a result, each magnetic flux can be expressed by the number of turns, the current, and the reluctances, as shown in FIG. 3.

FIG. 4 shows induced electromotive force (EMF) with regard to the three-phase coupled inductor of FIG. 1A, under Faraday's law. According to Faraday's law, the EMF is calculated by the rate of change of the magnetic flux φ and the EMF for the tightly wound coil of a wire is multiplied by the number of turns. Accordingly, the first EMF of the first winding is expressed as the product of the first number of turns $N_a$ and a rate of change of a net magnetic flux of the first winding, wherein the net magnetic flux of the first winding is calculated by subtracting a magnetic flux of the second winding at the first winding $\varphi_{ba}$ and a magnetic flux of the third winding at the first winding $\varphi_{ca}$ from the first magnetic flux $\varphi_a$. The final equation based on the Faraday's law is summarized as an impedance matrix in FIG. 4.

The coupled inductor should have a symmetrical load in order to get a symmetrical output; thus, the inductance of the impedance matrix should meet the following two conditions.

$$\begin{cases} \text{condition 1: } L_{aa} = L_{bb} = L_{cc} \\ \text{condition 2: } L_{ab} = L_{ba} = L_{ac} = L_{ca} = L_{bc} = L_{cb} \end{cases}$$

That is, the self impedances $L_{aa}$, $L_{bb}$, and $L_{cc}$ are equal to each other under a first condition, and the mutual impedances $L_{ab}$, $L_{ba}$, $L_{ac}$, $L_{ca}$, $L_{bc}$, and $L_{cb}$ are equal to each other under a second condition. When the two conditions are satisfied, the coupled inductor can have the balanced impedance and can achieve a balanced coupled inductor.

If the conditions are solved for symmetrical impedance, the solutions are as follows:

$$\begin{cases} N_a = N_c \\ N_b = \sqrt{\dfrac{R_0 + R_1/2}{R_1 + R_0 // R_1}}\, N_a \end{cases} \quad \text{Solutions for condition 1}$$

$$\begin{cases} N_a = N_c \\ N_b = \dfrac{R_0}{R_1} N_a \end{cases} \quad \text{Solutions for condition 2}$$

When $R_0$ is equal to $R_1$, the above equations have a general solution that all number of turns are the same. However, $R_0$ is not the same as $R_1$ as assumed in the initial assumption of $R_1=kR_0$ (wherein k is not 1).

In the three-phase case, each current of the first, second, and third windings can be expressed as a current matrix including a symmetrical component factor a with respect to the first phase current $i_a$ of the first winding, wherein the symmetrical component factor a represents 120 degrees difference in a perfectly balanced three-phase case.

$$\begin{bmatrix} i_a \\ i_b \\ i_c \end{bmatrix} = \begin{vmatrix} i_a \\ a i_a \\ a^2 i_a \end{vmatrix} = \begin{bmatrix} 1 & 0 & 0 \\ 0 & a & 0 \\ 0 & 0 & a^2 \end{bmatrix} \begin{bmatrix} i_a \\ i_a \\ i_a \end{bmatrix}$$

When the impedance matrix and the current matrix are combined with each other, the resultant equation is as follows:

$$\begin{bmatrix} V_{La} \\ V_{Lb} \\ V_{Lc} \end{bmatrix} = \begin{bmatrix} L_{aa} & -L_{ba} & -L_{ca} \\ -L_{ab} & L_{bb} & -L_{cb} \\ -L_{ac} & -L_{bc} & L_{cc} \end{bmatrix} \begin{bmatrix} \dot{i}_a \\ \dot{i}_b \\ \dot{i}_c \end{bmatrix} \Longrightarrow$$

$$\begin{bmatrix} V_{La} \\ V_{Lb} \\ V_{Lc} \end{bmatrix} = \begin{bmatrix} L_{aa} & -aL_{ba} & -a^2 L_{ca} \\ -L_{ab} & aL_{bb} & -a^2 L_{cb} \\ -L_{ac} & -aL_{bc} & a^2 L_{cc} \end{bmatrix} \begin{bmatrix} \dot{i}_a \\ \dot{i}_a \\ \dot{i}_a \end{bmatrix}$$

Figure 5A:
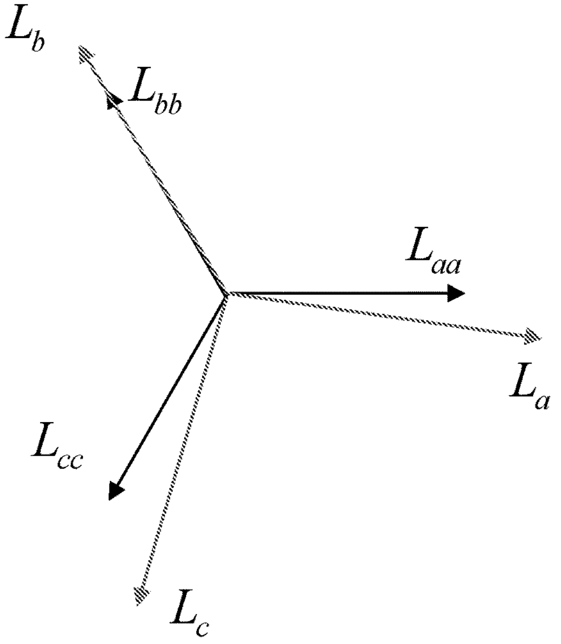
FIG. 5A shows an unbalanced impedance in which only one condition is met.

Thus, if only condition 1 is met and an additional condition of $L_{ab}=L_{bc}>L_{ac}$ is supposed as follows, both magnitude and phase of each EMF of the three-phase coupled inductor change, as shown in FIG. 5A.

$$L_{aa}=L_{bb}=L_{cc}L_{ab}=L_{ba}=L_{bc}=L_{cb}\neq L_{ac}=L_{ca}$$

Figure 5B:
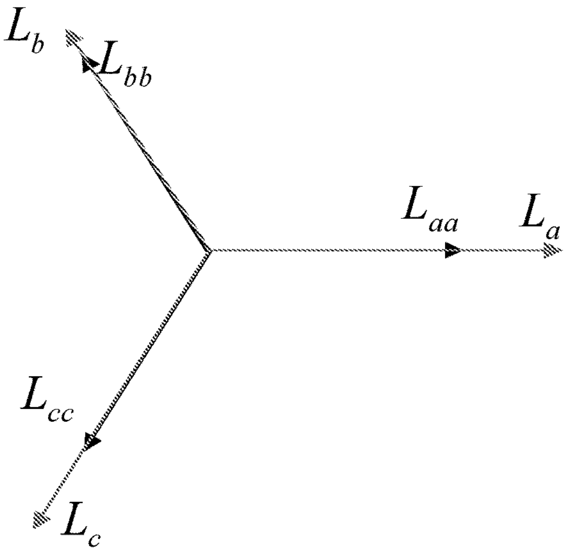
FIG. 5B shows an unbalanced impedance in which only one condition is met.

If only condition 2 is met as follows, only magnitude of each EMF of the three-phase coupled inductor changes, as shown in FIG. 5B.

$$L_{aa}=L_{cc}\neq L_{bb}L_{ab}=L_{ba}=L_{bc}=L_{cb}=L_{ac}=L_{ca}$$

That is, if only one condition out of condition 1 and condition 2 is met, it is difficult to get the balanced output from the three-phase coupled inductor with both magnitude and phase balanced. In a practical application, if manufacturers want to minimize the impact of the above unbalanced problem in the three-phase coupled inductor, the cores should be selected such that the reluctance $R_1$ is as close as possible to the reluctance $R_0$. This limitation, however, will largely shrink the selection range of the magnetic cores, and the selection itself may even be difficult, because most EE/EI cores from magnetic companies have the reluctance $R_1$ different from the reluctance $R_0$.

Figure 6:
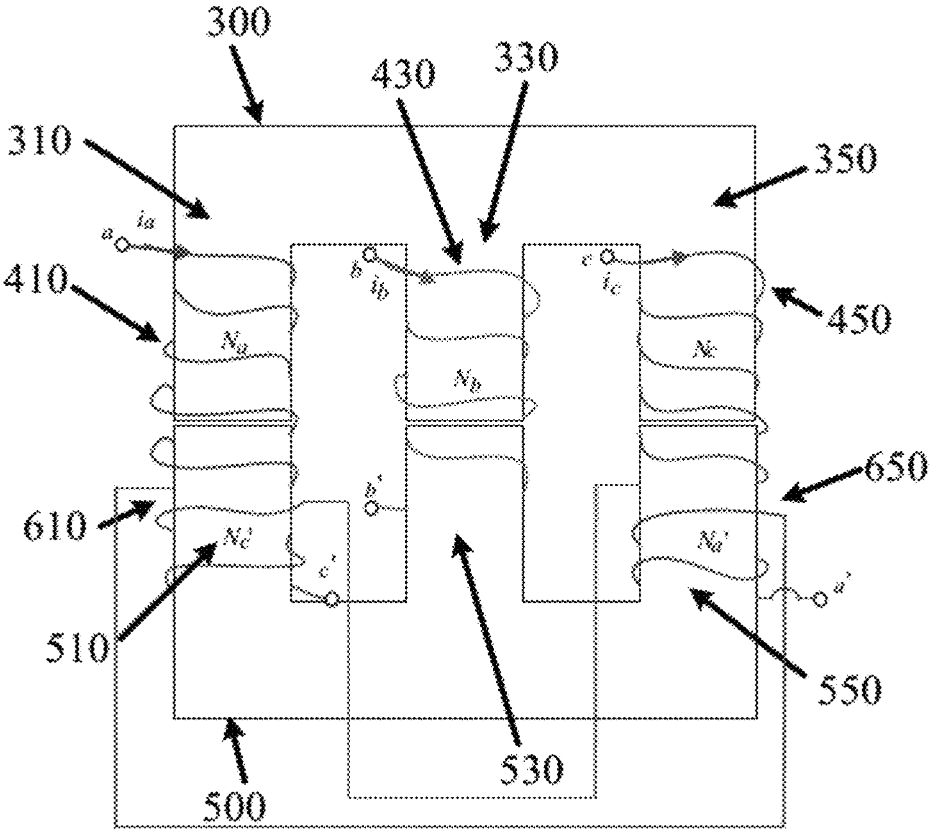
FIG. 6 shows a three-phase coupled inductor according to an embodiment of the subject invention.

In embodiments of the subject invention, the unbalanced problem can be solved by compensation windings. FIG. 6 shows a three-phase coupled inductor including compensation windings according to an embodiment of the subject invention. Referring to FIG. 6, a three-phase coupled inductor 100 can comprise an upper E core 300 and a lower E core 500, wherein the upper E core 300 comprises a first upper limb 310, a second upper limb 330, and a third upper limb 350, and the lower E core 500 comprises a first lower limb 510, a second lower limb 530, and a third lower limb 550. The second upper limb 330 is located between the first upper limb 310 and the third upper limb 350, and the second lower limb 530 is located between the first lower limb 510 and the third lower limb 550. That is, the first and third limbs can function as outer legs, and the second limbs can function as center legs.

A first winding 410 winds the first upper limb 310 and the first lower limb 510, a second winding 430 winds the second upper limb 330 and the second lower limb 530, and a third winding 450 winds the third upper limb 350 and the third lower limb 550. The first winding 410 turns $N_a$ times, where Na represents a number of turns of the first winding 410. Similarly, the second winding 430 and the third winding 450 turn $N_b$ times and $N_c$ times, respectively. In addition, the first to third windings 410,430,450 can turn counter-clockwise when viewed from a top side of the upper E core 300. As a compensation winding, a fourth winding 610 winds the first lower limb 510 and a fifth winding 650 winds the third lower limb 550. The fourth winding 610 and the fifth winding 650 can turn counter-clockwise when viewed from a bottom side of the lower E core 500. That is, the fourth winding 610 can turn clockwise when viewed from the top side of the upper E core 300, so a winding direction of the fourth winding 610 is different from a winding direction of the first winding 410. The fourth winding 610 turns $N_c'$ times, and the fifth winding 650 turns $N_a'$, thereby providing a number of turns of the fourth winding 610 $N_c'$ and a number of turns of the fifth winding 650 $N_a'$.

In an alternative embodiment, the first winding 410 winds only the first upper limb 310, the second winding 430 winds only the second upper limb 330, and/or the third winding 450 winds only the third upper limb 350. In yet another embodiment, the fourth winding 610 winds the first upper limb 310 and/or the fifth winding 650 winds the third upper limb 350. In a further embodiment, all first to fifth windings wind only the first 510 to third 550 lower limbs, respectively, of the lower E core 500, or wind only the first 310 to third 350 upper limbs, respectively, of the upper E core 300.

A first phase current $i_a$ flows through the first winding 410 from an input port a to an output port b and then flows through the fifth winding 650 from an input port c to an output port d. That is, the first phase current $i_a$ outputted from the output port b of the first winding 410 flows into the input port c of the fifth winding 650. A second phase current $i_b$ flows through the second winding 430. Similar to the first phase current $i_a$, a third phase current $i_c$ flows through the third winding 450 from an input port e to an output port f and then flows through the fourth winding 610 from an input port g to an output port h.

Under Faraday's law, the inductance matrix is as follows:

$$\begin{bmatrix} L_{oo} & -L_{bo} & -L_{co} \\ -L_{ob} & L_{bb} & -L_{cb} \\ -L_{oc} & -L_{bc} & L_{cc} \end{bmatrix}$$

where the self inductance and the mutual inductance with regard to the subject invention are as follows:

$$L_{aa} = \frac{N_a^2 + N_a'^2}{R_1 + R_1 // R_0} + \frac{2N_a N_a'}{R_1 + R_0 // R_1} \frac{R_0}{R_1 + R_0}$$

$$L_{ab} = L_{ba} = \frac{N_a N_b - N_a' N_b}{2R_0 + R_1}$$

$$L_{bb} = \frac{N_b^2}{R_0 + R_1 / 2}$$

$$L_{cb} = L_{bc} = \frac{N_c N_b - N_c' N_b}{2R_0 + R_1}$$

$$L_{cc} = \frac{N_c^2 + N_c'^2}{R_1 + R_1 // R_0} + \frac{2N_c N_c' R_0}{R_1 + R_0 // R_1 R_1 + R_0}$$

$$L_{ac} = L_{ca} = \frac{N_a N_c + N_a' N_c'}{R_1 + R_0 // R_1} \frac{R_0}{R_0 + R_1} + \frac{N_a' N_c + N_a N_c'}{R_1 + R_0 // R_1}$$

As set forth above, if the symmetrical impedance theory of condition 1 and condition 2 is applied to the inductor of FIG. 6, the general solution that meets both conditions is as follows:

$$N_a = \frac{1 + 2k + \sqrt{3k^2 + 6k}}{k - 1} N_a'$$

-continued $$N_b = \frac{a^2 + 2a + 1 + 2ka}{k(a-1)} N_a'$$

$$N_a = N_c;\ N_a' = N_c'$$

$$L_{aa} = L_{bb} = L_{cc} = \frac{a^2 + 2a + 1 + k + ka^2}{(k^2 + 2k)R_0} N_a'^2$$

$$L_{ab} = L_{ac} = L_{bc} = \frac{a^2 + 2a + 1 + 2ka}{(k^2 + 2k)R_0} N_a'^2$$

$$k = \frac{R_1}{R_0}$$

$$a = \frac{1 + 2k + \sqrt{3k^2 + 6k}}{k - 1}$$

That is, even if the reluctance $R_0$ is different from the reluctance $R_1$, the symmetrical impedance can be met by adjusting the number of turns $N_a$, $N_b$, $N_c$, $N_c'$, and $N_a'$ of the first to fifth windings, and it is possible to accomplish the balanced three-phase coupled inductor.

Figure 7:
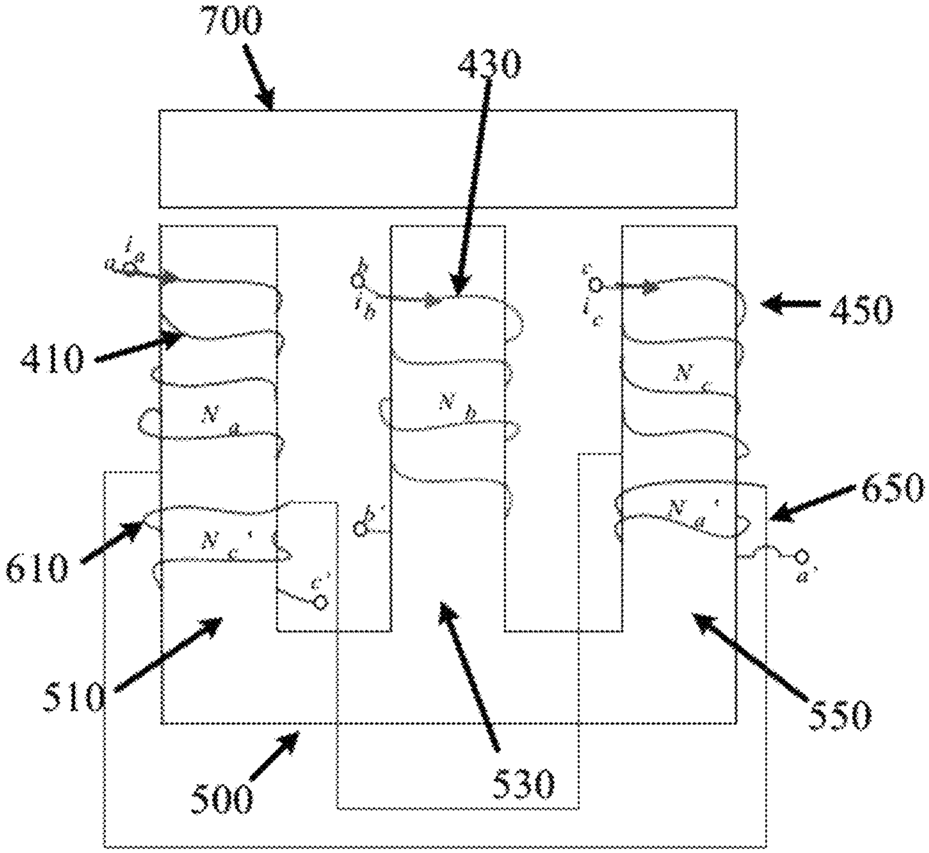
FIG. 7 shows a three-phase coupled inductor according to an embodiment of the subject invention.

FIG. 7 shows a three-phase coupled inductor including compensation windings according to an embodiment of the subject invention. Referring to FIG. 7, a three-phase coupled inductor 200 can comprise an upper I core 700 and a lower E core 500, wherein the lower E core 500 comprises a first lower limb 510, a second lower limb 530, and a third lower limb 550. The first 510 and third 550 lower limbs can function as outer legs, and the second lower limb 530 can function as a center leg.

A first winding 410 winds the first lower limb 510, a second winding 430 winds the second lower limb 530, and a third winding 450 winds the third lower limb 550. A fourth winding 610 winds the first lower limb 510, and a fifth winding 650 winds the third lower limb 550, thereby functioning as a compensation winding. The first winding 410 and the fourth winding 610 wind the same first lower limb 510, and the third winding 450 and the fifth winding 650 wind the same third lower limb 530. The number of turns, winding direction, and current flow of the windings are the same as those of the inductor of FIG. 6.

Figure 8:
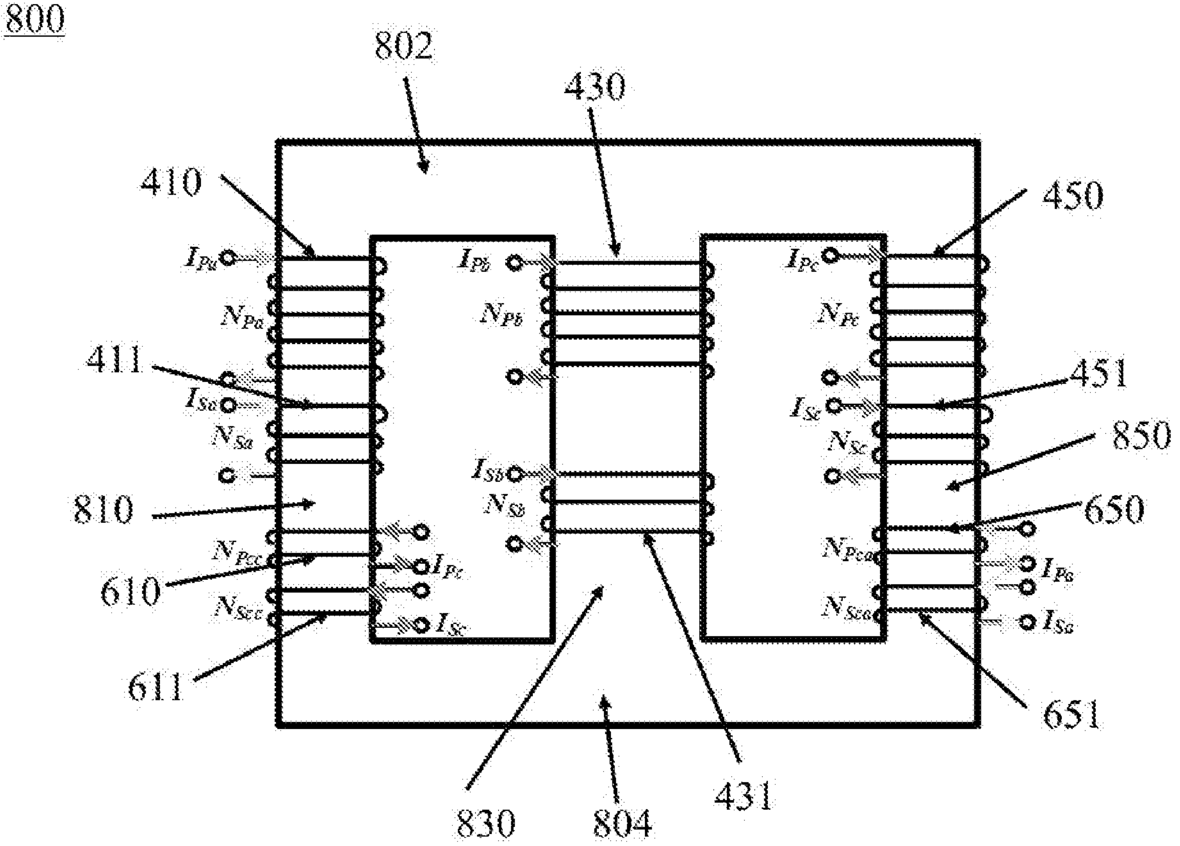
FIG. 8 shows a three-phase coupled inductor according to an embodiment of the subject invention.

FIG. 8 shows a three-phase coupled inductor including compensation windings according to an embodiment of the subject invention. Referring to FIG. 8, a three-phase coupled inductor 800 can comprise an upper body 802, a lower body 804, a first outer leg 810 connecting the upper body 802 and the lower body 804 at a left side, a second outer leg 850 connecting the upper body 802 and the lower body 804 at a right side, and a center leg 830 connecting the upper body 802 and the lower body 804 between the first outer leg 810 and the second outer leg 850. The upper body 802, the lower body 804, the first outer leg 810, the second outer leg 850, and the center leg 830 can be monolithically formed or integrally formed (e.g., without any airgap between them).

Similar to the embodiments depicted in FIGS. 6 and 7, the three-phase coupled inductor 800 can comprise a first 410 and a fourth 610 windings wrapping (or wrapped around) the first outer leg 810, a second winding 430 wrapping (or wrapped around) the center leg 830, and a third 450 and a fifth 650 windings wrapping (or wrapped around) the second outer leg 850. The three-phase coupled inductor 800 further comprises a sixth winding 411 wrapping (or wrapped around) the first outer leg 810, a seventh winding 431 wrapping (or wrapped around) the center leg 830, an eighth winding 451 wrapping (or wrapped around) the second outer leg 850, a ninth winding 611 wrapping (or wrapped around) the first outer leg 810, and a tenth winding 651 wrapping (or wrapped around) the second outer leg 850.

The first to fifth windings 410, 430, 450, 610, 650 can function as primary windings, and the sixth to tenth windings 411, 431, 451, 611, 651 can function as secondary windings. A primary first phase current $I_{Pa}$ flows from the first winding 410 to the fifth winding 650, a primary second phase current $I_{Pb}$ flows through the second winding 430, and a primary third phase current $I_{Pc}$ flows from the third winding 450 to the fourth winding 610. Similarly, a secondary first phase current $I_{Sa}$ flows from the sixth winding 411 to the tenth winding 651, a secondary second phase current $I_{Sb}$ flows through the seventh winding 431, and a secondary third phase current $I_{Sc}$ flows from the eighth winding 451 to the ninth winding 611. That is, the fifth winding 650 and the fourth winding 610 can be compensation windings for the primary first phase current $I_{Pa}$ and the primary third phase current $I_{Pc}$, respectively, and the tenth winding 651 and the ninth winding 611 can be compensation windings for the secondary first phase current $I_{Sa}$ and the secondary third phase current $I_{Sc}$, respectively.

The first winding 410 turns $N_{Pa}$ times, where $N_{Pa}$ represents a number of turns of the first winding 410. The second winding 430 and the third winding 450 turn $N_{Pb}$ times and $N_{Pc}$ times, respectively. The fourth winding 610 turns $N_{Pcc}$ times, and the fifth winding 650 turns $N_{Pca}$, thereby providing a number of turns of the fourth winding 610 $N_{Pcc}$ and a number of turns of the fifth winding 650 $N_{Pca}$. Similarly, the sixth winding 411, the seventh winding 431, the eighth winding 451, the ninth winding 611, and the tenth winding 651 have a number of turns of $N_{Sa}$, $N_{Sb}$, $N_{Sc}$, $N_{Scc}$, and $N_{Sca}$, respectively.

The first to third windings 410,430,450 can turn counter-clockwise when viewed from the upper body 802, and the fourth winding 610, and the fifth winding 650 can turn counter-clockwise when viewed from the lower body 804 such that a winding direction of the fourth winding 610 is different from a winding direction of the first winding 410. Similarly, the sixth to eighth windings 411,431,451 can turn counter-clockwise when viewed form the upper body 802, and the ninth winding 611 and the tenth winding 651 turn counter-clockwise when viewed form the lower body 804. These turn directions are for exemplary purposes only and are not limiting; each or any winding can turn in the opposite direction from what is given as an example in this paragraph.

FIGS. 6 and 7 illustrate non-limiting examples of three-phase coupled inductors comprising an upper E core and a lower E core or comprising an upper I core and a lower E core, and FIG. 8 illustrates a three-phase coupled inductor comprising one three-leg core. A person of ordinary skill in the art can determine other type of three-phase coupled inductors including one or more compensation windings as discussed herein. In addition, embodiments of the subject invention can include multi-phase (e.g., other than three-phase) coupled inductors having one or more compensation windings. For example, a multi-phase coupled inductor can include a first outer leg, a second outer leg, a center leg between the first outer leg and the second outer leg, a first coil winding the first outer leg, a second coil winding the center leg, a third coil winding the second outer leg, and a compensation coil winding at least one of the first outer leg, the second outer leg, and the center leg. A first phase current can flow through the first coil, a second phase current can flow through the second coil, and a third phase current can flow through the third coil, wherein at least one of the first, second, and third phase currents flows through the compensation coil.

The subject invention includes, but is not limited to, the following exemplified embodiments.

Embodiment 1

A multi-phase coupled inductor comprising:

a first winding on a first limb;

a second winding on a second limb;

a third winding on a third limb;

a fourth winding on the first limb; and a fifth winding on the third limb, wherein a first number of turns of the first winding is the same as a third number of turns of the third winding, and wherein a fourth number of turns of the fourth winding is the same as a fifth number of turns of the fifth winding.

Embodiment 2

The multi-phase coupled inductor according to embodiment 1, wherein the first limb and the third limb are outer legs and the second limb is a center leg.

Embodiment 3

The multi-phase coupled inductor according to embodiment 2, wherein a first phase current flows through the first winding, a second phase current flows through the second winding, and a third phase current flows through the third winding.

Embodiment 4

The multi-phase coupled inductor according to embodiment 3, wherein the first phase current outputted from the first winding flows into the fifth winding and the third phase current outputted from the third winding flows into the fourth winding.

Embodiment 5

The multi-phase coupled inductor according to embodiment 4, wherein the multi-phase coupled inductor includes a lower E core and an upper E core.

Embodiment 6

The multi-phase coupled inductor according to embodiment 5, wherein the first limb comprises a first upper limb of the upper E core and a first lower limb of the lower E core, the second limb comprises a second upper limb of the upper E core and a second lower limb of the lower E core, and the third limb comprises a third upper limb of the upper E core and a third lower limb of the lower E core.

Embodiment 7

The multi-phase coupled inductor according to embodiment 6, the fourth winding winds the first lower limb and the fifth winding winds the third lower limb.

Embodiment 8

The multi-phase coupled inductor according to any of embodiments 4-7, wherein the first number of turns and the fifth number of turns are expressed as the following Formula 1

$$N_a = \frac{1 + 2k + \sqrt{3k^2 + 6k}}{k - 1} N_a' \qquad \text{Formula 1}$$

$$k = \frac{R_1}{R_0}$$

wherein, the first number of turns is $N_a$, the fifth number of turns is $N_a'$, $R_0$ is a reluctance of each limb in a magnetic equivalent circuit of the multi-phase coupled inductor, and $R_1$ is a summation of the reluctance $R_0$ and two reluctances $R_s$ between the first limb and the second limb in the magnetic equivalent circuit.

Embodiment 9

The multi-phase coupled inductor according to embodiment 8, wherein the second number of turns is expressed as the following Formula 2

$$N_b = \frac{a^2 + 2a + 1 + 2ka}{k(a - 1)} N_a' \qquad \text{Formula 2}$$

$$a = \frac{1 + 2k + \sqrt{3k^2 + 6k}}{k - 1}$$

wherein, the second number of turns is $N_b$.

Embodiment 10

The multi-phase coupled inductor according to embodiment 4, wherein the multi-phase coupled inductor includes a lower E core and an upper I core, and the lower E core includes the first limb, the second limb, and the third limb.

Embodiment 11

A multi-phase coupled inductor comprising:

a first winding on a first limb;

a second winding on a second limb;

a third winding on a third limb;

a fourth winding on the first limb; and a fifth winding on the third limb, wherein a first phase current flows through the first winding and the fifth winding, wherein a second phase current flows through the second winding, and wherein a third phase current flows through the third winding and the fourth winding.

Embodiment 12

The multi-phase coupled inductor according to embodiment 11, wherein a first winding direction of the first winding is different from a fourth winding direction of the fourth winding and a third winding direction of the third winding is different from a fifth winding direction of the fifth winding.

Embodiment 13

The multi-phase coupled inductor according to embodiment 12, wherein a second winding direction of the second winding is the same as the first winding direction and the third winding direction.

Embodiment 14

The multi-phase coupled inductor according to embodiment 13, wherein the fourth winding direction is the same as the fifth winding direction.

Embodiment 15

The multi-phase coupled inductor according to embodiments 11-14, wherein a first number of turns of the first winding is the same as a third number of turns of the third winding, and a fourth number of turns of the fourth winding is the same as a fifth number of turns of the fifth winding.

Embodiment 16

The multi-phase coupled inductor according to embodiment 15, wherein a second number of turns of the second winding is smaller than the first number of turns and larger than the fourth number of turns.

Embodiment 17

A multi-phase coupled inductor comprising:

an upper E core comprising a first upper limb, a second upper limb, and a third upper limb;

a lower E core comprising a first lower limb, a second lower limb, and a third lower limb;

a first winding to wind the first upper limb;

a second winding to wind the second upper limb;

a third winding to wind the third upper limb;

a fourth winding to wind the first lower limb; and a fifth winding to wind the third lower limb.

Embodiment 18

The multi-phase coupled inductor according to embodiment 17, wherein the first, second, and third upper limbs face the first, second, and third lower limbs, respectively.

Embodiment 19

The multi-phase coupled inductor according to embodiment 18, wherein a first phase current flows from the first winding to the fifth winding and a third phase current flows from the third winding to the fourth winding.

Embodiment 20

The multi-phase coupled inductor according to embodiment 19, wherein the first limb is longer than the second limb.

Embodiment 21

The multi-phase coupled inductor according to embodiment 19, wherein the second limb is wider than the first limb.

Embodiment 22

The multi-phase coupled inductor according to embodiments 18-21, wherein the first upper limb is spaced apart from the first lower limb by an airgap.

Embodiment 23

The multi-phase coupled inductor according to any of embodiments 17-22, wherein the first winding winds the first lower limb and the third winding winds the third lower limb.

Embodiment 24

The multi-phase coupled inductor according to any of embodiments 1-23, wherein the multi-phase coupled inductor is a three-phase coupled inductor.

Embodiment 25

A multi-phase coupled inductor comprising:

a first outer leg;

a second outer leg;

a center leg between the first outer leg and the second outer leg;

a first coil winding the first outer leg;

a second coil winding the center leg;

a third coil winding the second outer leg; and a compensation coil winding at least one of the first outer leg, the second outer leg, and the center leg;

wherein a first phase current flows through the first coil, wherein a second phase current flows through the second coil, wherein a third phase current flows through the third coil, and wherein at least one of the first, second, and third phase currents flows through the compensation coil.

Embodiment 26

The multi-phase coupled inductor according to embodiment 25, wherein the compensation coil comprises a fourth coil winding the first outer leg and a fifth coil winding the second outer leg.

Embodiment 27

The multi-phase coupled inductor according to embodiment 26, wherein the first phase current flows through the fifth coil and the third phase current flows through the fourth coil.

Embodiment 28

A multi-phase coupled inductor comprising:

an upper body;

a lower body;

a first outer leg connecting the upper body and the lower body at a left side;

a second outer leg connecting the upper body and the lower body at a right side;

a center leg connecting the upper body and the lower body between the first outer leg and the second outer leg;

a first winding wrapping the first outer leg;

a second winding wrapping the center leg;

a third winding wrapping the second outer leg;

a fourth winding wrapping the first outer leg;

a fifth winding wrapping the second outer leg;

a sixth winding wrapping the first outer leg;

a seventh winding wrapping the center leg;

an eighth winding wrapping the second outer leg;

a ninth winding wrapping the first outer leg; and a tenth winding wrapping the second outer leg, wherein, the upper body, the lower body, the first outer leg, the second outer leg, and the center leg are formed integrally (and/or monolithically).

Embodiment 29

The multi-phase coupled inductor according to embodiment 28, wherein a primary first phase current flows through the first winding and the fifth winding, and a primary second phase current flows through the second winding, and a primary third phase current flows through the third winding and the fourth winding.

Embodiment 30

The multi-phase coupled inductor according to any of embodiments 28-29, wherein a secondary first phase current flows through the sixth winding and the tenth winding, and a secondary second phase current flows through the seventh winding, and a secondary third phase current flows through the eighth winding and the ninth winding.

Embodiment 31

The multi-phase coupled inductor according to any of embodiments 28-30, wherein a first winding direction of the first winding is the same as a sixth winding direction of the sixth winding, a second winding direction of the second winding is the same as a seventh winding direction of the seventh winding, and a third winding direction of the third winding is the same as an eighth winding direction of the eighth winding.

Embodiment 32

The multi-phase coupled inductor according to any of embodiments 28-31, wherein a fourth winding direction of the fourth winding is the same as a ninth winding direction of the ninth winding and a tenth winding direction of the tenth winding.

Embodiment 33

The multi-phase coupled inductor according to embodiment 32, wherein the first winding direction is different from the fourth winding direction, and wherein the third winding direction is different from the fifth winding direction.

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

EXAMPLE 1

Three-phase coupled Inductor Having Compensation Windings

A three-phase coupled inductor can include: an upper E core comprising a first upper limb, a second upper limb, and a third upper limb; a lower E core comprising a first lower limb, a second lower limb, and a third lower limb; a first winding to wind the first upper limb and the first lower limb; a second winding to wind the second upper limb and the second lower limb; a third winding to wind the third upper limb and the third lower limb; a fourth winding to wind the first lower limb; and a fifth winding to wind the third lower limb.

Figure 9A:
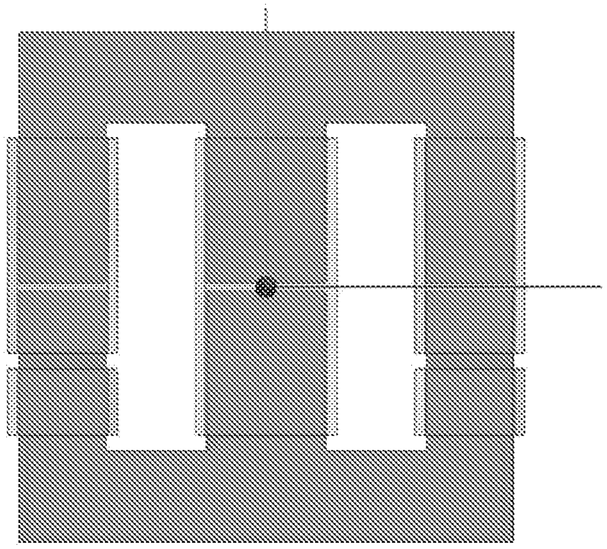
FIG. 9A shows a front view of upper and lower E cores of a three-phase coupled inductor according to an embodiment of the subject invention.
Figure 9B:
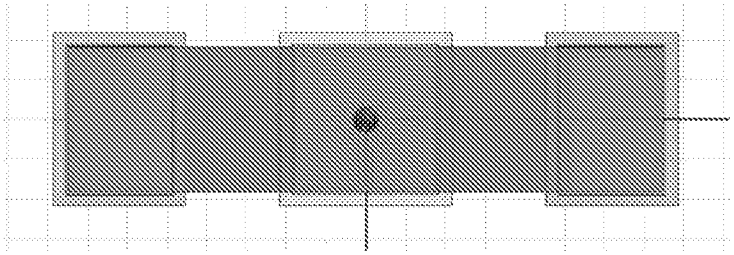
FIG. 9B shows a top view of the upper E core of a three-phase coupled inductor according to an embodiment of the subject invention.
Figure 9C:
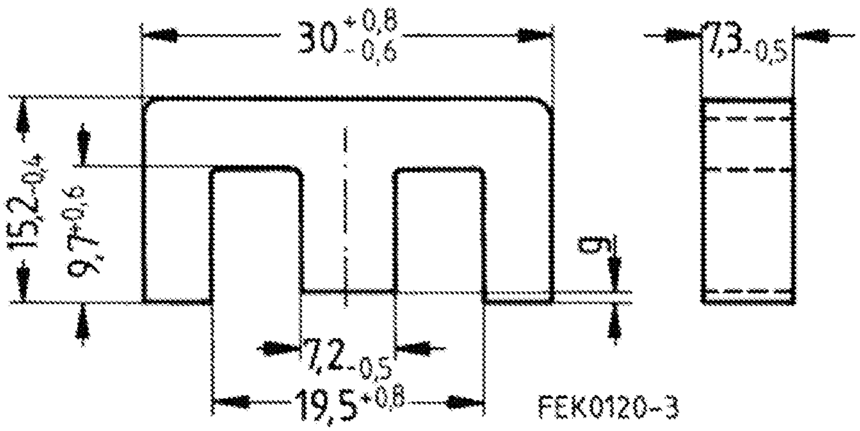
FIG. 9C shows a measurement of each E core of a three-phase coupled inductor according to an embodiment of the subject invention.

FIGS. 9A, 9B, and 9C show a front view of the upper and lower E cores, a top view of the upper E core, and a measurement of each E core, respectively. The upper E core is spaced apart from the lower E core by an airgap. The second limb (center leg) is shorter than the first limb (outer leg) and wider than the first limb. The first winding and the third winding turn 42 times, the second winding turns 40 times, and each of the fourth winding and the fifth winding turns 2 times. The exemplified configuration is designed so that the self impedance is 0.12148 milliHenry (mH) and the mutual impedance is 0.0608 mH. The parameters are as follows.

| Type | Value |
|---|---|
| Airgap length | 0.5 mm |
| Central leg reluctance R0 | 7.8238e6 |
| Outer leg reluctance R1 | 1.0583e7 |
| K(=R1/RO) | 1.3526 |
| Na(=Nc) | 42 |
| Na'(=Nc') | 2 |
| Nb | 40 |
| Lself | 0.12148 mH |
| Lmutual | 0.0608 mH |

Figure 10:
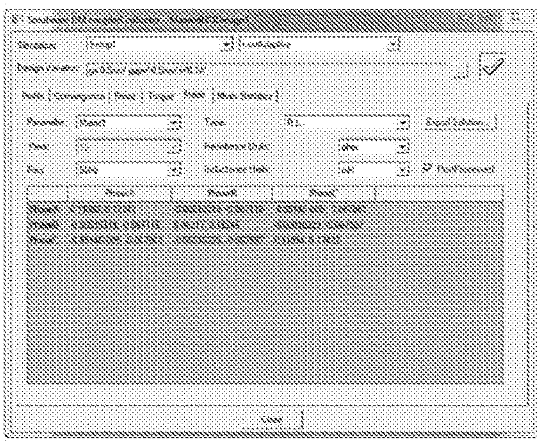
FIG. 10 shows simulation results for a three-phase coupled inductor according to an embodiment of the subject invention.

FIG. 10 shows simulation results for the three-phase coupled inductor. Even though a simulated self impedance value and a simulated mutual impedance value are different from the designed values, the simulated self impedances are close to each other and the simulated mutual impedances are close to each other. That is, the simulation verifies that the three-phase coupled inductor is a balanced three-phase coupled inductor. Given a leakage inductance, a fringing effect of the airgap, and other effects in the simulation, the difference between the simulation result and the designed value is reasonable.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:

1. A three-phase coupled inductor comprising:

a first winding on a first limb;

a second winding on a second limb;

a third winding on a third limb;

a fourth winding on the first limb; and a fifth winding on the third limb, wherein a first number of turns of the first winding is the same as a third number of turns of the third winding, wherein a fourth number of turns of the fourth winding is the same as a fifth number of turns of the fifth winding, wherein a first phase current flows through the first winding and the fifth winding, wherein a third phase current flows through the third winding and the fourth winding, wherein the first number of turns and the fifth number of turns are expressed as the following Formula 1

$$N_a = \frac{1 + 2k + \sqrt{3k^2 + 6k}}{k - 1} N_a' \quad \text{Formula 1}$$

$$k = \frac{R_1}{R_0}$$

wherein, the first number of turns is $N_a$, the fifth number of turns is $N_a$', $R_0$ is a reluctance of each limb in a magnetic equivalent circuit of the three-phase coupled inductor, and $R_1$ is a summation of the reluctance $R_0$ and two reluctances $R_s$ between the first limb and the second limb in the magnetic equivalent circuit, and wherein a second number of turns of the second winding is expressed as the following Formula 2

$$N_b = \frac{a^2 + 2a + 1 + 2ka}{k(a - 1)} N_a' \quad \text{Formula 2}$$

$$a = \frac{1 + 2k + \sqrt{3k^2 + 6k}}{k - 1}$$

wherein, the second number of turns is $N_b$.

2. The three-phase coupled inductor according to claim 1, wherein the first limb and the third limb are outer legs and the second limb is a center leg.

3. The three-phase coupled inductor according to claim 2, wherein a second phase current flows through the second winding.

4. The three-phase coupled inductor according to claim 3, wherein the first phase current outputted from the first winding flows into the fifth winding and the third phase current outputted from the third winding flows into the fourth winding.

5. The three-phase coupled inductor according to claim 4, wherein the three-phase coupled inductor includes a lower E core and an upper E core.

6. The three-phase coupled inductor according to claim 5, wherein the first limb comprises a first upper limb of the upper E core and a first lower limb of the lower E core, the second limb comprises a second upper limb of the upper E core and a second lower limb of the lower E core, and the third limb comprises a third upper limb of the upper E core and a third lower limb of the lower E core.

7. The three-phase coupled inductor according to claim 6, the fourth winding winds the first lower limb and the fifth winding winds the third lower limb.

8. The three-phase coupled inductor according to claim 4, wherein the three-phase coupled inductor includes a lower E core and an upper I core, and the lower E core includes the first limb, the second limb, and the third limb.

9. A three-phase coupled inductor comprising:

a first winding on a first limb;

a second winding on a second limb;

a third winding on a third limb;

a fourth winding on the first limb; and a fifth winding on the third limb, wherein a first phase current flows through the first winding and the fifth winding, wherein a second phase current flows through the second winding, wherein a third phase current flows through the third winding and the fourth winding, wherein a first number of turns of the first winding and a fifth number of turns of the fifth winding are expressed as the following Formula 1

$$N_a = \frac{1 + 2k + \sqrt{3k^2 + 6k}}{k - 1} N_a' \quad k = \frac{R_1}{R_0} \quad \text{Formula 1}$$

wherein, the first number of turns is $N_a$, the fifth number of turns is $N_a$', $R_0$ is a reluctance of each limb in a magnetic equivalent circuit of the three-phase coupled inductor, and $R_1$ is a summation of the reluctance $R_0$ and two reluctances $R_s$ between the first limb and the second limb in the magnetic equivalent circuit, and wherein a second number of turns of the second winding is expressed as the following Formula 2

$$N_b = \frac{a^2 + 2a + 1 + 2ka}{k(a - 1)} N_a' \quad a = \frac{1 + 2k + \sqrt{3k^2 + 6k}}{k - 1} \quad \text{Formula 2}$$

wherein, the second number of turns is $N_b$.

10. The three-phase coupled inductor according to claim 9, wherein a first winding direction of the first winding is different from a fourth winding direction of the fourth winding and a third winding direction of the third winding is different from a fifth winding direction of the fifth winding.

11. The three-phase coupled inductor according to claim 10, wherein a second winding direction of the second winding is the same as the first winding direction and the third winding direction.

12. The three-phase coupled inductor according to claim 11, wherein the fourth winding direction is the same as the fifth winding direction.

13. The three-phase coupled inductor according to claim 9, wherein the first number of turns is the same as a third number of turns of the third winding, and a fourth number of turns of the fourth winding is the same as the fifth number of turns.

14. The three-phase coupled inductor according to claim 13, wherein the second number of turns is smaller than the first number of turns and larger than the fourth number of turns.

15. A three-phase coupled inductor comprising:

an upper E core comprising a first upper limb, a second upper limb, and a third upper limb;

a lower E core comprising a first lower limb, a second lower limb, and a third lower limb;

a first winding to wind the first upper limb;

a second winding to wind the second upper limb;

a third winding to wind the third upper limb;

a fourth winding to wind the first lower limb; and a fifth winding to wind the third lower limb, wherein a first phase current flows through the first winding and the fifth winding, wherein a third phase current flows through the third winding and the fourth winding, wherein a first number of turns of the first winding and a fifth number of turns of the fifth winding are expressed as the following Formula 1

$$N_a = \frac{1 + 2k + \sqrt{3k^2 + 6k}}{k - 1} N_a' \quad k = \frac{R_1}{R_0} \qquad \text{Formula 1}$$

wherein, the first number of turns is $N_a$, the fifth number of turns is $N_a$', $R_0$ is a reluctance of each pair of upper and lower limbs in a magnetic equivalent circuit of the three-phase coupled inductor, and $R_1$ is a summation of the reluctance $R_0$ and two reluctances $R_s$ between the first upper limb and the second upper limb in the magnetic equivalent circuit, and wherein a second number of turns of the second winding is expressed as the following Formula 2

$$N_b = \frac{a^2 + 2a + 1 + 2ka}{k(a - 1)} N_a' \quad a = \frac{1 + 2k + \sqrt{3k^2 + 6k}}{k - 1} \qquad \text{Formula 2}$$

wherein, the second number of turns is $N_b$.

16. The three-phase coupled inductor according to claim 15, wherein the first, second, and third upper limbs face the first, second, and third lower limbs, respectively.

17. The three-phase coupled inductor according to claim 16, wherein the first phase current flows from the first winding to the fifth winding and the third phase current flows from the third winding to the fourth winding.

18. The three-phase coupled inductor according to claim 17, wherein the first limb is longer than the second limb.

19. The three-phase coupled inductor according to claim 17, wherein the second limb is wider than the first limb.

20. The three-phase coupled inductor according to claim 16, wherein the first upper limb is spaced apart from the first lower limb by an airgap.

21. The three-phase coupled inductor according to claim 15, wherein the first winding winds the first lower limb and the third winding winds the third lower limb.

22. A multi-phase coupled inductor comprising:

a first outer leg;

a second outer leg;

a center leg between the first outer leg and the second outer leg;

a first coil winding the first outer leg;

a second coil winding the center leg;

a third coil winding the second outer leg; and a compensation coil comprising a fourth coil winding the first outer leg and a fifth coil winding the second outer leg, wherein a first phase current flows through the first coil and the fifth coil, wherein a second phase current flows through the second coil, wherein a third phase current flows through the third coil and the fourth coil, and wherein a first number of turns of the first coil and a fifth number of turns of the fifth coil are expressed as the following Formula 1

$$N_a = \frac{1 + 2k + \sqrt{3k^2 + 6k}}{k - 1} N_a' \quad k = \frac{R_1}{R_0} \qquad \text{Formula 1}$$

wherein, the first number of turns is $N_a$, the fifth number of turns is $N_a$', $R_0$ is a reluctance of each leg in a magnetic equivalent circuit of the multi-phase coupled inductor, and $R_1$ is a summation of the reluctance $R_0$ and two reluctances $R_s$ between the first leg and the center leg in the magnetic equivalent circuit, and wherein a second number of turns of the second coil is expressed as the following Formula $$N_b = \frac{a^2 + 2a + 1 + 2ka}{k(a - 1)} N_a' \quad a = \frac{1 + 2k + \sqrt{3k^2 + 6k}}{k - 1} \qquad \text{Formula 2}$$

wherein, the second number of turns is $N_b$.

23. The multi-phase coupled inductor according to claim 22, wherein the first phase current flows from the first coil to the fifth coil and the third phase current flows from the third coil to the fourth coil.

24. A multi-phase coupled inductor comprising:

an upper body;

a lower body;

a first outer leg connecting the upper body and the lower body at a left side;

a second outer leg connecting the upper body and the lower body at a right side;

a center leg connecting the upper body and the lower body between the first outer leg and the second outer leg;

a first winding wrapping the first outer leg;

a second winding wrapping the center leg;

a third winding wrapping the second outer leg;

a fourth winding wrapping the first outer leg;

a fifth winding wrapping the second outer leg;

a sixth winding wrapping the first outer leg;

a seventh winding wrapping the center leg;

an eighth winding wrapping the second outer leg;

a ninth winding wrapping the first outer leg; and a tenth winding wrapping the second outer leg, wherein, the upper body, the lower body, the first outer leg, the second outer leg, and the center leg are integrally formed, wherein a primary first phase current flows through the first winding and the fifth winding, wherein a primary third phase current flows through the third winding and the fourth winding, wherein a secondary first phase current flows through the sixth winding and the tenth winding, wherein a secondary third phase current flows through the eighth winding and the ninth winding, and wherein the first to fifth windings are primary windings, and the sixth to tenth windings are secondary windings.

25. The multi-phase coupled inductor according to claim 24, wherein a primary second phase current flows through the second winding.

26. The multi-phase coupled inductor according to claim 25, wherein a secondary second phase current flows through the seventh winding.

27. The multi-phase coupled inductor according to claim 26, wherein a first winding direction of the first winding is the same as a sixth winding direction of the sixth winding, a second winding direction of the second winding is the same as a seventh winding direction of the seventh winding, and a third winding direction of the third winding is the same as an eighth winding direction of the eighth winding.

28. The multi-phase coupled inductor according to claim 27, wherein a fourth winding direction of the fourth winding is the same as a ninth winding direction of the ninth winding and a tenth winding direction of the tenth winding.

29. The multi-phase coupled inductor according to claim 28, wherein the first winding direction is different from the fourth winding direction, and wherein the third winding direction is different from the fifth winding direction.

* * * * *